United States Patent
Stebbings

(10) Patent No.: US 6,564,253 B1
(45) Date of Patent: May 13, 2003

(54) CONTENT AUTHORIZATION SYSTEM OVER NETWORKS INCLUDING SEARCHING AND REPORTING FOR UNAUTHORIZED CONTENT LOCATIONS

(75) Inventor: David W. Stebbings, Washington, DC (US)

(73) Assignee: Recording Industry Association of America, Washington, DC (US)

( * ) Notice: Subject to any disclaimer, the term of this patent is extended or adjusted under 35 U.S.C. 154(b) by 0 days.

(21) Appl. No.: 09/306,754

(22) Filed: May 7, 1999

(51) Int. Cl.[7] .............................................. G06F 15/16
(52) U.S. Cl. ...................... 709/217; 709/218; 709/219; 705/44; 705/52; 705/57; 380/201
(58) Field of Search ................................. 709/217–219; 707/1; 380/203, 201; 386/94; 705/52, 57, 44

(56) References Cited

U.S. PATENT DOCUMENTS

| | | | |
|---|---|---|---|
| 4,595,950 A | 6/1986 | Lofberg | 380/202 |
| 4,972,471 A | 11/1990 | Gross et al. | 455/201 |
| 5,319,735 A | 6/1994 | Preuss et al. | 709/205 |
| 5,629,980 A | 5/1997 | Stefik et al. | 705/54 |
| 5,710,815 A * | 1/1998 | Ming et al. | 380/20 |
| 5,719,937 A | 2/1998 | Warren et al. | 380/203 |
| 5,765,152 A | 6/1998 | Erickson | 707/9 |
| 5,790,664 A * | 8/1998 | Coley et al. | 380/4 |
| 5,809,145 A | 9/1998 | Slik et al. | 705/52 |
| 5,978,649 A * | 11/1999 | Kahn | 455/3.1 |
| 6,006,332 A | 12/1999 | Rabne et al. | 713/201 |
| 6,044,471 A | 3/2000 | Colvin | 713/202 |
| 6,052,780 A | 4/2000 | Glover | 713/193 |
| 6,081,897 A | 6/2000 | Bersson | 713/200 |
| 6,233,684 B1 | 5/2001 | Stefik et al. | 713/176 |
| 6,343,138 B1 * | 1/2002 | Rhoads | 382/100 |

FOREIGN PATENT DOCUMENTS

WO    WO 98/31010    7/1998

* cited by examiner

*Primary Examiner*—Nabil El-Hady
(74) *Attorney, Agent, or Firm*—Irah H. Donner; Hale and Dorr LLP

(57) ABSTRACT

An Internet or other content authorization system consists of an Internet authorization notice in the form of a flag. This flag can be embedded in each original recording at the time of manufacture, such that a primary feature of the flagging system is to prevent Internet access and unauthorized use of any original recording that does not contain an Internet authorization flag. The Internet authorization flag can be recorded on a media, such as digital audio tapes (DATs), compact discs (CDs), digital video/versatile discs (DVDs), and personal computers (PCs), or subjected to a transmission channel or network, including satellite, cable, the Internet or intranets. The Internet authorization flagging system also allows control of different kinds of authorized Internet uses that may be made, and is capable of identifying the existence and location of unauthorized Internet use.

26 Claims, 12 Drawing Sheets

CONTENT AUTHORIZATION SYSTEM OVER NETWORKS INCLUDING SEARCHING AND REPORTING FOR UNAUTHORIZED CONTENT LOCATIONS

FIELD OF THE INVENTION

The present invention relates generally to an Internet global network or content authorization system and method associated therewith, and more particularly to an Internet authorization system and method where original recordings are embedded with, for example, an Internet or content authorization flag for the purpose of preventing unauthorized use or distribution of proprietary data on or via the Internet or other networked configuration.

BACKGROUND OF INVENTION

The proliferation of consumer devices used for recording and play back of pre-recorded signals extends far beyond tape recorders and television. Consumer devices now include high quality media, such as digital audio tapes (DATs), compact discs (CDs), digital video discs (DVDs), and personal computers, (PCs). Along with the rise in prevalent use of these high technology devices, however, is an increase in the unauthorized use and copying of copyrighted works such as audio, video and the like, comprised of signals, such as analog or digital signal, particularly on the Internet.

Consequently, there is a growing need to protect the proprietary rights of copyright owners, for example, that distribute their works such as products and/or services, in electronic form. Copyright owners include entertainment and education service providers, such as music recording and software industry companies. Their products and/or services include music, music videos, movies, games, educational information, and other audio or video information applications. Each of these service providers distribute a combination of audio and/or video, or other data through a network, including satellite, cable and networks such as the Internet, via one or more Internet Service Providers (ISPs).

Moreover, this data is generally stored on temporary or permanent storage media that is distributed through physical or electronic channels. Physically, the data is generally distributed through retail and point-of-sale stores and outlets. Electronically, the data is distributed over the Internet and intranets (i.e. electronic mail). These storage media include magnetic tapes (audio and video cassettes), computer floppy disks, and high-quality media, such as CDs, DVDs, PCs and laser discs.

Today's problem is actualized when proprietary data, such as music, is accessed and/or retrieved and/or copied and/or distributed over the Internet without the service provider's permission. This unauthorized use of proprietary data presents an on-going problem for service providers: namely, significantly reduced sales. Pirate copying over the Internet has been estimated as costing the music and software industries billions of dollars each year in lost revenues.

Prior art devices have not solved this problem. U.S. Pat. No. 4,595,950, incorporated herein by reference, describes a method for processing a coded information signal, which may comprise video and/or audio information, that is eventually supplied to a television. Referring to Prior Art FIG. 1, an information signal INF, which is transmitted in coded form CINF from a signal source RC to a signal receiver 4, 5, is decoded at the receiver 4, 5, and at the same time marked MINF by the introduction of an identification information ID, which is characteristic of the receiver or its possessor. The signal from a video disc RC carrying a coded program is decoded and marked before it is supplied to a television set 6.

U.S. Pat. No. 4,972,471, incorporated herein by reference, describes a method of encoding a given recorded signal, made up of a host of frequencies, comprising modifying the recorded signal to selectively alter in a known manner a portion of the recorded signal to produce a machine recognizable start code. The machine recognizable start code is generally imperceptible to normal human recognition when the recorded signal is played in its intended manner. Referring to Prior Art FIG. 2, which gives an overall view of the method of encoding, the audio signal 10 is processed through a filter and certain scanning frequencies 11 are separated from the signal for separate processing. The scanning frequencies 11 first undergo a review 12 to locate a proper location within the signal to be encoded by placing of a start code.

Once an appropriate location within the signal is determined, the audio signal is replayed, and at the appropriate location, the start code is introduced by means of a device 13. Digitizing of the signal is carried out at 14 and provides a recognizable fingerprint 16. Thus, in recording of the signal, a "fingerprint" is generated, a start code is introduced into the audio signal, and the signal is recorded at 18. The processing of the scanning frequencies introduces a certain fixed delay which is compensated for by delaying of the other frequencies at device 20.

U.S. Pat. No. 5,319,735, incorporated herein by reference, describes a system for embedding a code signal in an audio signal in a manner such that the composite signal is not readily distinguishable from the original audio signal by listening, and in a manner such that the code signal cannot be readily removed or obscured without simultaneously degrading the quality of the audio signal.

Referring to Prior Art FIG. 3, a sequence of code symbols to be embedded in an audio signal is derived as the output of an Error Control Encoder 25. The resulting sequence of code symbols is further encoded by means of a Spread Spectra Modulator 26 to produce a code signal that represents the sequence of code symbols. The code signal is then modified by means of a Code Signal Shaper 27 to produce a modified code signal with frequency component levels. The dynamically modified code signal is then combined with the original audio signal by means of a Signal Combiner 28 to produce a composite audio signal, which is then recorded on a recording medium, such as a DAT, or is otherwise subjected to a transmission channel.

WO 9831010, incorporated herein by reference, describes an apparatus for monitoring and preventing unauthorized copying of digital data. The apparatus includes a recording device for recording digital data on a first storage medium, and a reading device for reading from a second storage medium. A computer, which is connected to the recording device and the reading device over a bus, is programmed to execute pre-mastering instructions, as shown in Prior Art FIG. 4, to enable reading of data from the second storage medium to record the data on the first storage medium.

The computer in WO 9831010 includes instructions for inhibiting copying of the data when the data is subject to copyright, and includes the detection of a notice of copyright in the data. The pre-mastering instructions are inhibited from reading the data, which includes the copyright notice, so as to prevent any recording of the data on the first medium.

However, none of the prior art devices incorporated by reference above offer protection against unauthorized use of proprietary data over, for example, the Internet. That is, I have determined that there are unique considerations relating to authorizing appropriate use of data over networks, such as the Internet, that have not heretofore been considered.

Accordingly, it would be highly desirable to provide an Internet or content authorization system for controlling access to, and use of, proprietary data that is distributed electronically. With current technology, there also remains a need to provide a system for encoding original recordings with an authorization flag whose existence will alleviate the problems of unauthorized activity of propriety data, such as certain Internet uses, without significantly affecting the quality of the proprietary data.

The authorization system, I have determined, will advantageously allow selective control of differing kinds of authorized uses that may be made. For example, the authorization system will allow no copying, a limited number of copying, or an unlimited number of copying. Similarly, the authorization system will also allow selective control of single listening/viewing, a limited number of listening/viewing, an unlimited number of listening/viewing, or multiple listening/viewing.

In addition, the authorization system advantageously provides the capability to identify the source, of an unauthorized use of proprietary data on a network, such as the Internet. The present invention provides a system having the above and other advantages.

SUMMARY OF INVENTION

Accordingly, a feature and advantage of the present invention is to provide a novel and useful authorization system in which the above disadvantages are minimized.

A more specific feature and advantage of the present invention is to provide a system for encoding original recordings with an authorization system, which among other things, may solve the problems of unauthorized activity of proprietary data signals over networks, such as the Internet.

These and other objects of the present invention are achieved by an Internet authorization system that is capable of identifying the existence and source of unauthorized use and copying of proprietary data via the Internet.

The Internet authorization flagging system of the present invention is compatible with the "Multi-Media Copy Management System" described in U.S. Pat. No. 5,719,937, incorporated herein by reference. The present invention is also compatible with other methods for processing or embedding coded signals as disclosed in U.S. Pat. Nos. 4,595,950, 4,972,471, 5,319,735, which are incorporated herein by reference. Additionally, the present invention may be used in combination with a copyright flag as described in PCT application WO 9831010, also incorporated herein by reference.

In one aspect of the invention, an Internet authorization flag can be recorded on a recording medium or transmitted electronically, by transforming the flag, using a spread spectrum technique, into a modified code signal representing digital information, in such a way that the modified code signal can be combined with an original audio signal to form a composite audio signal. This composite audio signal is not easily differentiable from the original audio signal by ordinary listening. In other words, the modified code signal and the audio signal are combined to provide a composite audio signal in which the authorization flag is embedded in the audio as, or a function of, the modified code signal.

More specifically, the digital information (containing, for example, the Internet authorization flag) may, in one alternative, be represented by a sequence of code symbols, which in turn is represented by a pseudo-random number sequence that is detectable by a matched filter. Each composite audio signal can now be recorded or subjected to a transmission channel, which process may distort and/or modify the composite audio signal. The digital information can, nevertheless, be recovered from the distorted or modified composite audio signal by a method that is a compliment or inverse of the method that produced the composite audio signal. In this way, the recovered digital information is reliable without any degrading of the quality of the composite audio signal or original information.

To achieve these features and advantages, the present invention provides an Internet authorization system for preventing Internet access and unauthorized use of proprietary data over the Internet. The system comprises: (a) a plurality of interconnected general purpose computers that are networked together in at least one of an intranet and Internet arrangement; (b) encoding means for encoding an Internet authorization flag, indicating authorized Internet access to proprietary data stored on a media, with at least one of a continuously and periodically encoded sequence, and optionally compressing the encoded Internet authorization flag; (c) media storage means for storing, in a media, proprietary data and the encoded Internet authorization flag; (d) a network system means for distributing the media to at least one of an Internet service provider, a network provider, a site provider and an authorized broker of the media; (e) searching means for searching data, contained on at least one of the Internet, intranet and network, for existence of an Internet authorization flag when a user accesses a web site on at least one of the Internet, intranet and network; and (f) printing means for printing a report indicating a location of each unauthorized Internet use of the media not containing an Internet authorization flag.

Another embodiment of the present invention provides for a content authorization system for at least one of preventing content access and unauthorized use of proprietary data over at least one of a global network, local network and the Internet. The content authorization system comprises: (a) a plurality of at least one of workstations and computers, each including a first storage device for storing first data therein; and (b) a network connectable to said plurality of at least one of workstations and computers. The network includes a second storage device for storing second data thereon. The network is managed by or interconnectable with at least one of an Internet service provider, a network provider, a site provider, and an authorized broker or distributor of the proprietary data. The network stores proprietary data including at least one authorization data flag indicating at least one authorization level indicative of authorized usage of the proprietary data for at least one of the network and plurality of at least one of workstations and computers.

A further embodiment of the present invention includes a method of using an Internet authorization system for preventing Internet access and unauthorized use of proprietary data over the Internet. The method includes the steps of: (a) encoding an Internet authorization flag, indicating authorized Internet access to proprietary data stored on a media, with at least one of a continuously and periodically encoded sequence, and optionally compressing the encoded Internet authorization flag; (b) storing, in a media, the proprietary data and the encoded Internet authorization flag; (c) distributing the media to at least one of an Internet service provider, a site provider, a network provider, and an authorized broker of the media; (d) providing access to the proprietary data stored on the media responsive to the Internet authorization flag indicating authorized Internet access to the proprietary data; (e) searching data, contained on at least one of the Internet, intranet and network, for existence of the Internet authorization flag when a user accesses a web site on either the Internet, intranet and network; and (f) printing a report indicating a location of each unauthorized Internet use of said media not containing an Internet authorization flag.

Another process embodiment of the present invention includes a method of using a network authorization system for preventing network access and unauthorized use of proprietary data over the network. The method includes the steps of: (a) encoding a network flag, indicating authorized network access to proprietary data stored on a media, with at least one of a continuously and periodically encoded sequence, and optionally compressing the encoded network authorization flag; (b) storing, in a media, the proprietary data and the encoded network authorization flag; (c) distributing media to at least one of a network service provider, a site provider and an authorized broker of the media; (d) providing access to the proprietary data stored on the media responsive to the network authorization flag indicating authorized network access to the proprietary data; (e) searching data, contained on at least one of the Internet, intranet and network, for existence of an Internet authorization flag when a user accesses a web site on at least one of the Internet, intranet and network; and (f) printing a report indicating a location of each unauthorized network use of the media not containing a network authorization flag.

A further embodiment of the present invention includes a method for using a content authorization system for preventing electronic access and unauthorized use of proprietary data from a first destination to a second destination. The method includes the steps of: (a) encoding a content authorization flag, indicating authorized electronic access to proprietary data stored on a media, with at least one of a continuously and periodically encoded sequence, and optionally compressing the content authorization flag; (b) storing, in a media, the proprietary data and the encoded content authorization flag; (c) distributing the media to at least one of an Internet service provider, network service provider, site provider, and an authorized broker of the media; (d) providing access to the proprietary data stored on the media responsive to a content authorization flag indicating authorized electronic access to the proprietary data; (e) searching data, contained on at least one of the Internet, intranet and network, for existence of the Internet authorization flag when a user accesses a web site on at least one of said Internet, intranet and network; and (f) printing a report indicating a location of each unauthorized content use of the media not containing a content authorization flag.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The scope of the invention, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter which illustrate preferred embodiments of the invention.

DESCRIPTION OF THE DRAWINGS

A preferred embodiment of the invention is shown in the drawings, wherein.

NOTATIONS AND NOMENCLATURE

Figure 1:
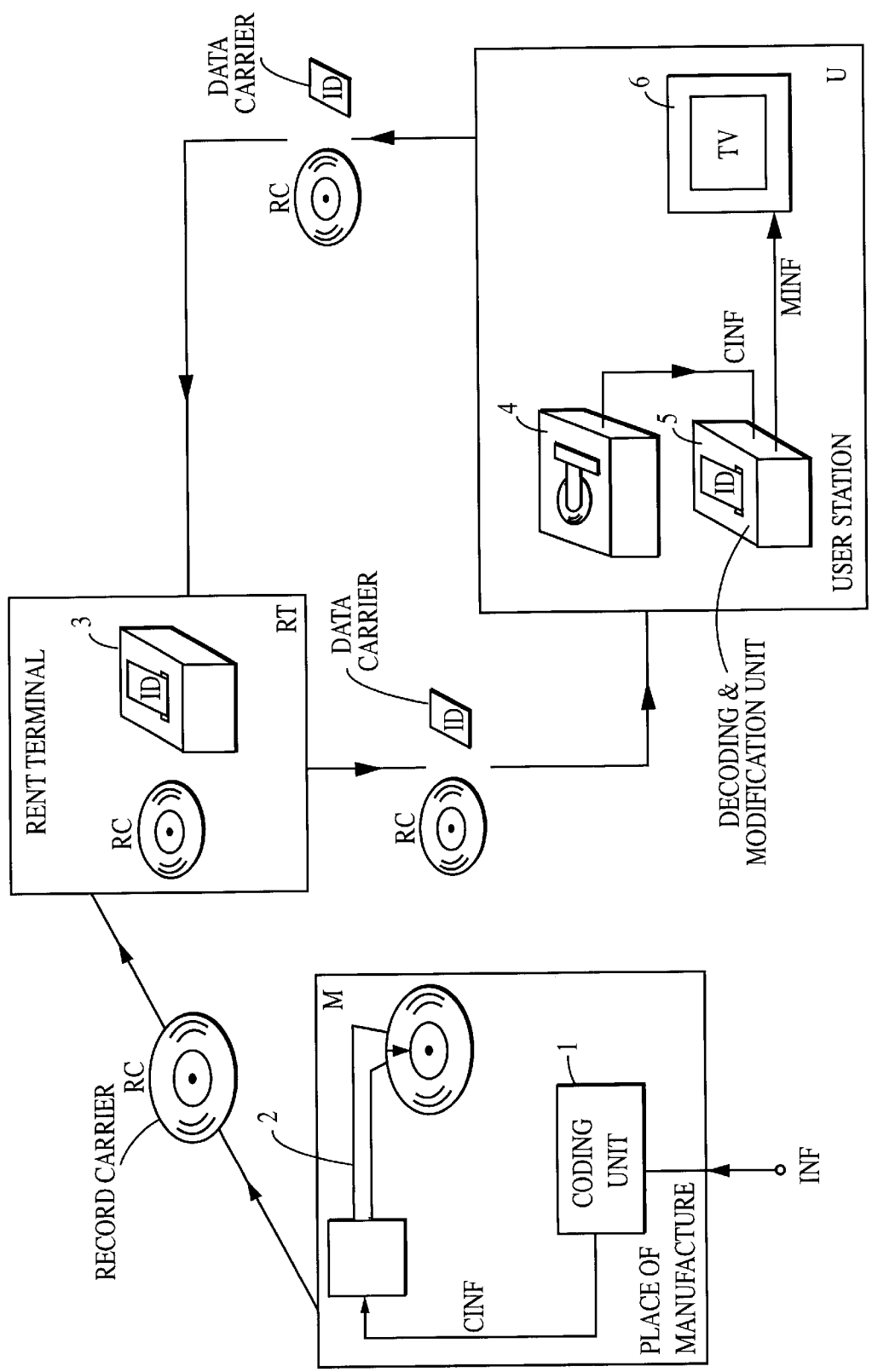
FIG. 1 shows a conventional method for processing a coded information signal.
Figure 2:
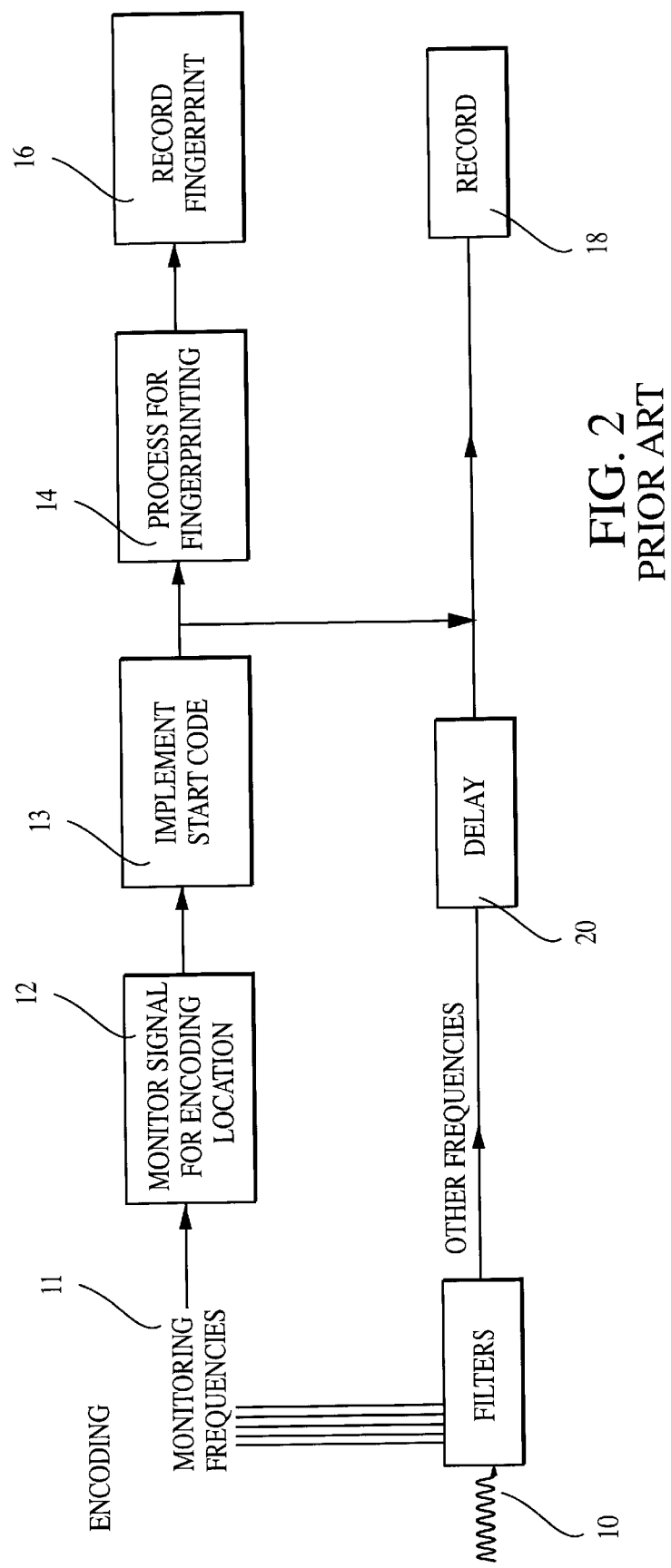
FIG. 2 shows a conventional method of encoding a given recorded signal.
Figure 3:
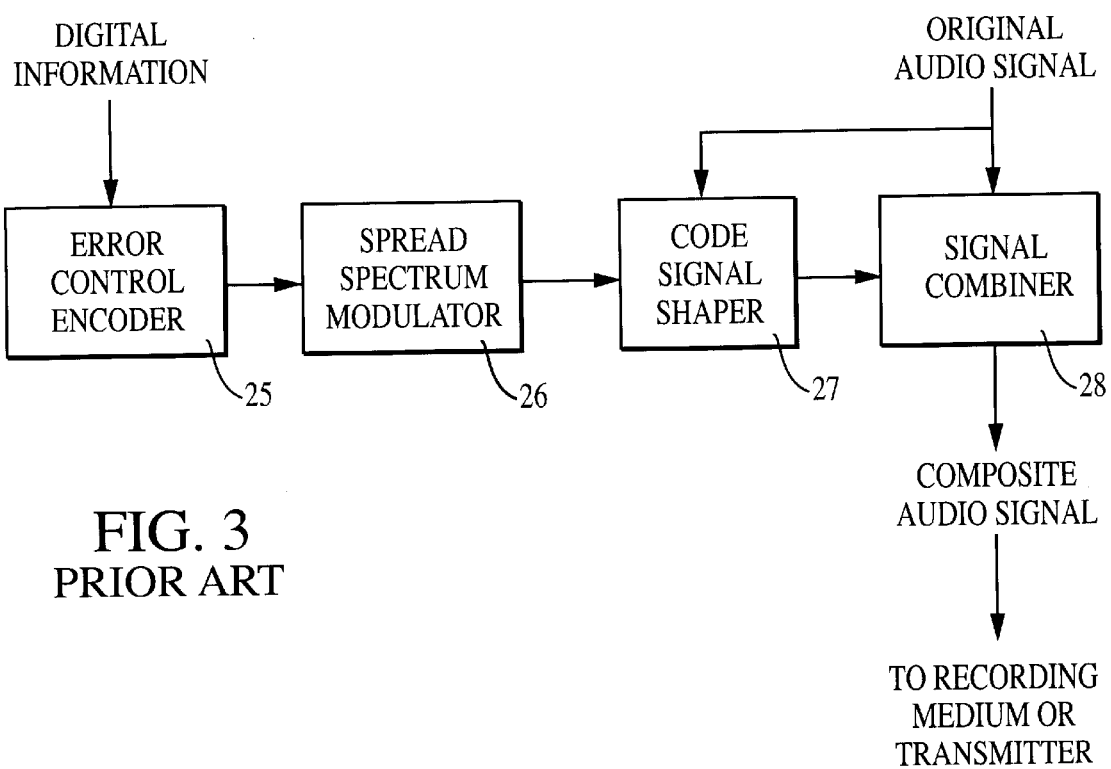
FIG. 3 shows a conventional method for embedding a code signal in an audio signal.
Figures 4, 4A:
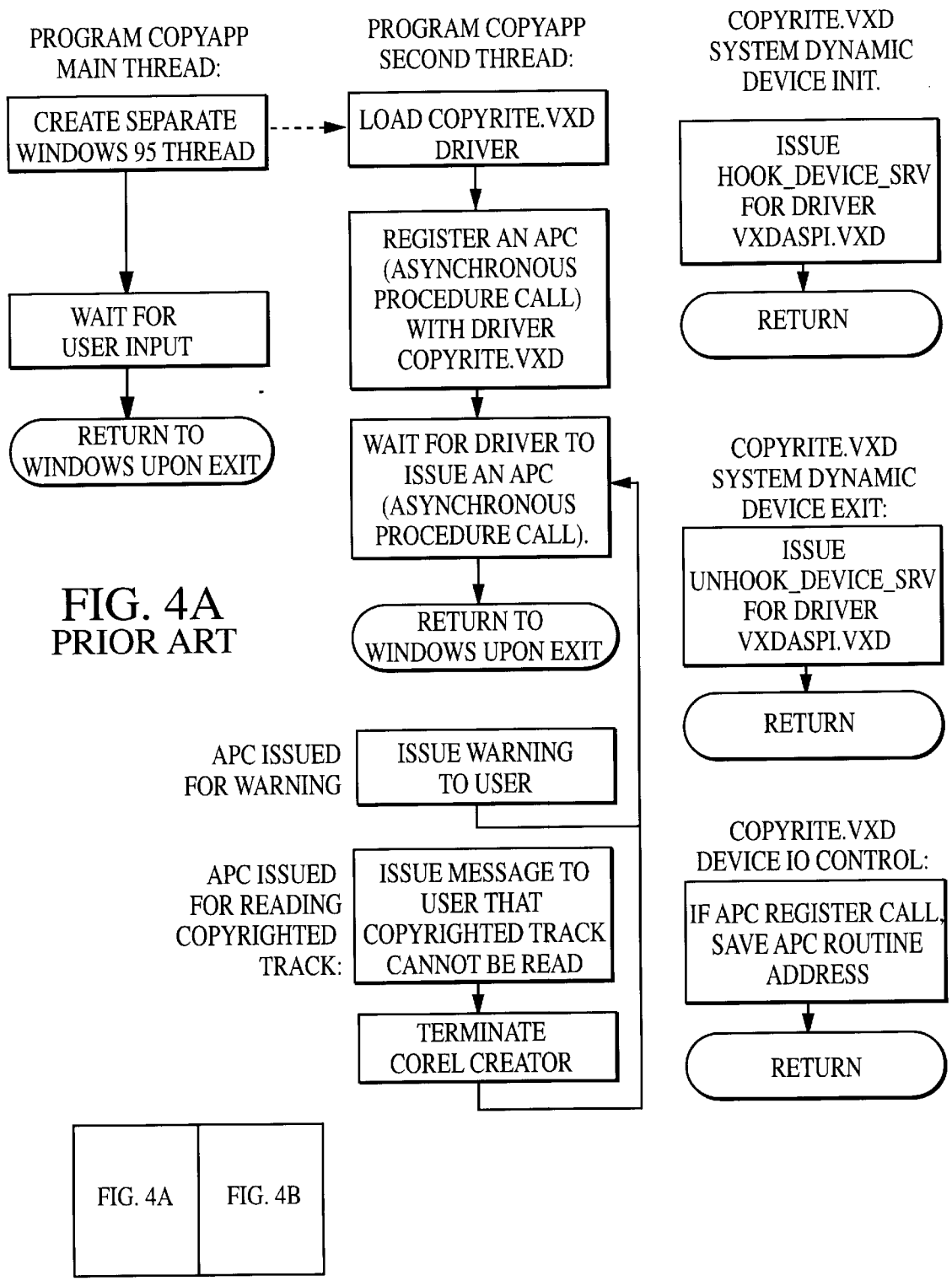
FIG. 4 shows conventional software instructions for monitoring and preventing unauthorized copying of digital data.
Figure 4B:
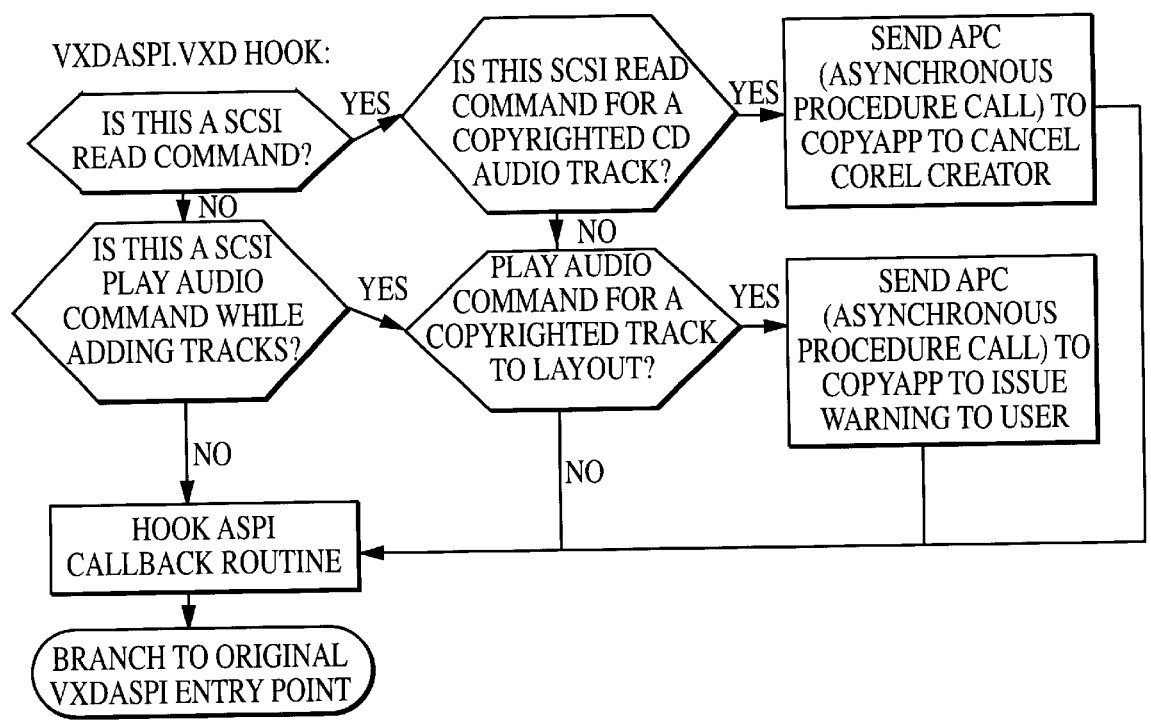
Figure 4B:
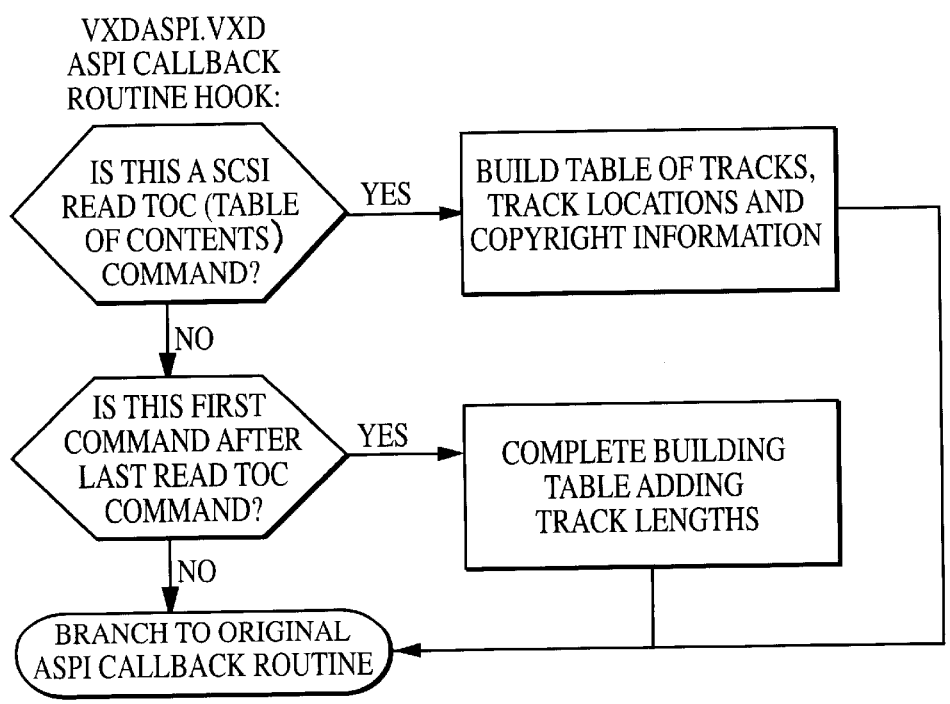

The detailed descriptions that follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to an apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct a more specialized apparatus to perform the required method steps. The required structure for a variety of these machines will appear from the description given.

DETAILED DESCRIPTION OF THE PREFERRED EMBODIMENTS

In the particular embodiment of the system of the present invention described herein, the Internet authorization system consists of, or includes, an Internet authorization notice in the form of a flag. This flag is embedded in each original recording at the time of manufacture, such that a primary feature of the system is to prevent Internet, or other, access and use of any original recording that does not contain an Internet or content authorization flag.

Any source material that has at least a single audio channel can take advantage of the present invention. Additionally, the distribution format is not limited, and can include various means as discussed herein.

Moreover, while many of the various processing steps to be described may be performed by analog circuitry, these steps may alternatively be performed by digital techniques, such as those conventionally implemented in special purpose digital signal processing integrated circuits or high speed micro-computers. Thus, while various components or steps of the method of the present invention are represented by separate blocks in diagrams in the drawings, these steps are preferably implemented by suitable programming of a digital processor or other processor.

Each authorization flag can be embedded using known embedding/encoding methods, which is compatible with the present invention. Encoding may be accomplished by adding, for example, an Internet authorization flag to a digital or analog master tape or digital stream, which may be compressed or uncompressed. The Internet authorization flag may be embedded in digital format, for instance, as a code symbol or sequence of code symbols into a data source, such as a master audio signal. Generally, flag data can be embedded on either a continuous or periodic basis.

Figure 5:
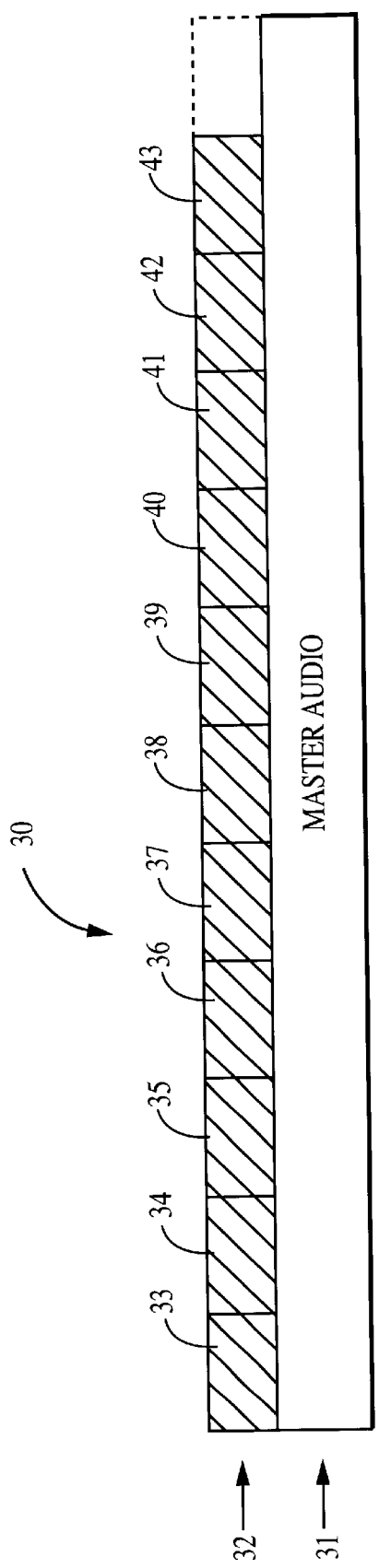
FIG. 5 shows a block diagram of a data stream with a continuously encoded sequence that is compatible with the present invention.

FIG. 5 illustrates a block diagram of a data stream with a continuously encoded sequence that may be compatible with an Internet authorization flag of the present invention. According to this embodiment, the data stream 30 consists of a master audio layer 31 and a flag data layer 32. Time increases from left to right. The flag data layer 32 may carry a plurality of adjacent Internet authorization flags 33–43. Alternatively, standard Internet flags 33–43 may be represented by one continuous flag within the flag data layer 32.

Figure 6:
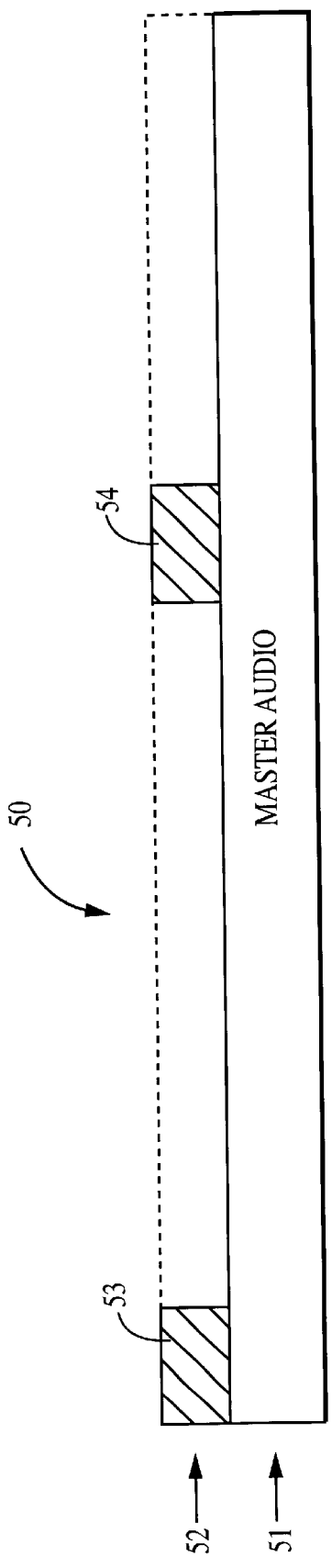
FIG. 6 shows a block diagram of a data stream with a periodically encoded sequence that is compatible with the present invention.

FIG. 6 illustrates a block diagram of a data stream with a periodically encoded sequence that may also be compatible with an Internet authorization flag of the present invention. According to this embodiment, the data stream 50 consists of a master audio layer 51 and a flag data layer 52, which may carry a plurality of fixedly or variably spaced Internet authorization flags 53, 54.

Thus, using conventional spread spectrum techniques, a master audio signal can be modified and combined with an original audio signal (e.g., music) to form a composite signal, which may be stored on media, such as a cassette, CD, DVD, electronic audio/video files, or the like. Alternatively, the composite signal may be transmitted over a communication network, such as the Internet, other networks, or intranets.

Figure 7:
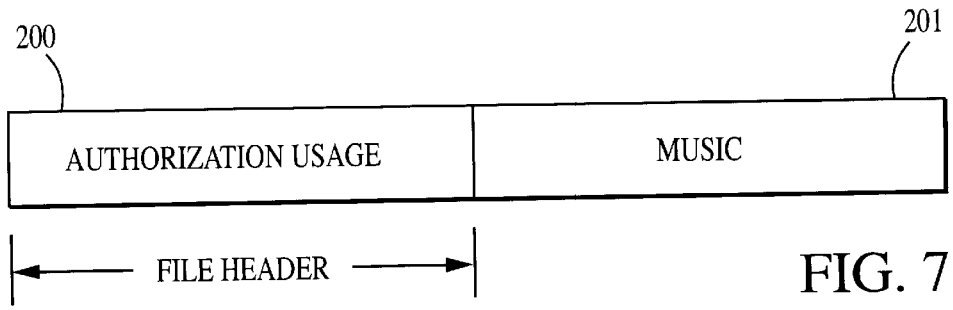
FIG. 7 shows an authorization usage file header compatible with the present invention.

In another embodiment of the invention, encoding may be accomplished by adding an authorization usage header, of specified length, at the beginning of each digital or analog master tape or digital stream. Referring to FIG. 7, each digital stream containing music 201 is preceded by an authorization usage file header 200, which may include, for example, between 64 to 128 bits of information. Of course, any number of suitable bits of information may be used.

Figure 8:
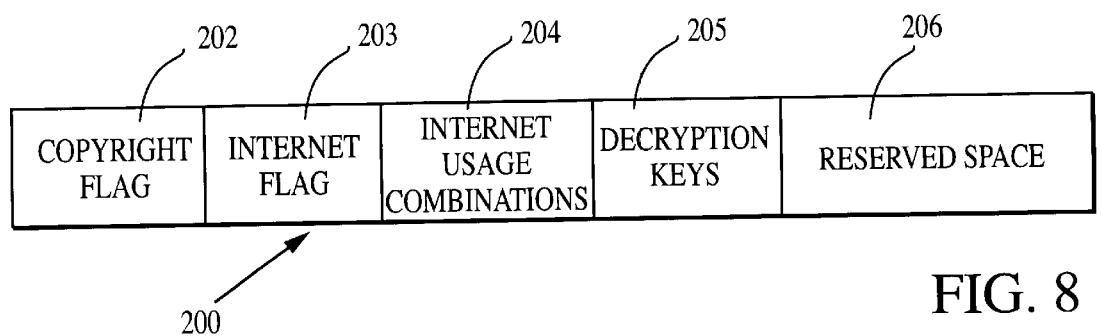
FIG. 8 shows an exploded view of the authorization usage file header compatible with the present invention.

An exploded view of the authorization usage file header 200 is shown in FIG. 8. Header 200 includes one or more digital indicators pertaining to: (1) a copyright flag 202, used to identify whether a music is subject to copyright; (2) an Internet or content authorization flag 203, for determining whether music is authorized for Internet or other network activity; (3) Internet/content usage combinations 204, for determining the variety of permissible uses of music, such as listening, distribution and/or copying; (4) decryption keys 205, for locking and unlocking access to the music; and (5) reserved space 206 for future digital indicators. Additionally, header 200 is compatible with conventional electronic commerce payment systems, for facilitating and determining user payment over the Internet or other network.

Figure 9:
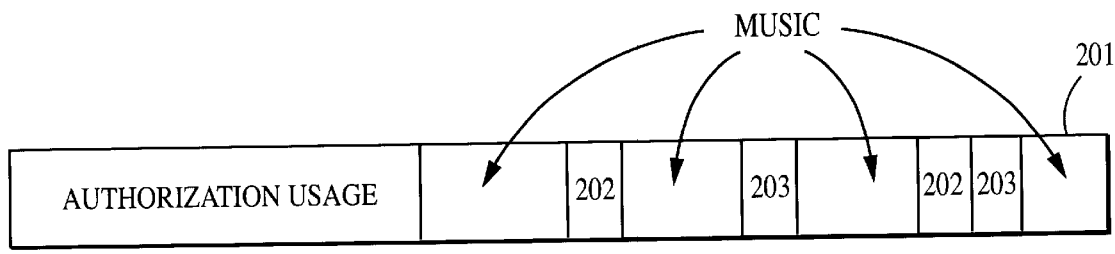
FIG. 9 shows an alternative method of encoding an Internet authorization flag of the present invention.

Alternatively, as shown in FIG. 9, encoding may be accomplished by interspersing digital indicators for copyright and Internet/content authorization flags 202, 203, throughout music 201, in addition to adding flags 202, 203, in the authorization usage file 200 at the beginning of a music file header.

It is important that each optionally coded signal, which is modified or applied to the content of an original audio signal, satisfy certain threshold criterion; namely that code modification occurs in a manner that does not impair the intended quality of the signal; that the resulting composite signal is inaudible, distinctive, not easily erased or deleted, and is easily recoverable. This criterion applies to alternative embodiments of the invention in which a media or electronic file may contain, in addition to an audio data signal, one or more video signals (e.g., movies, music videos, etc.).

Figure 10:
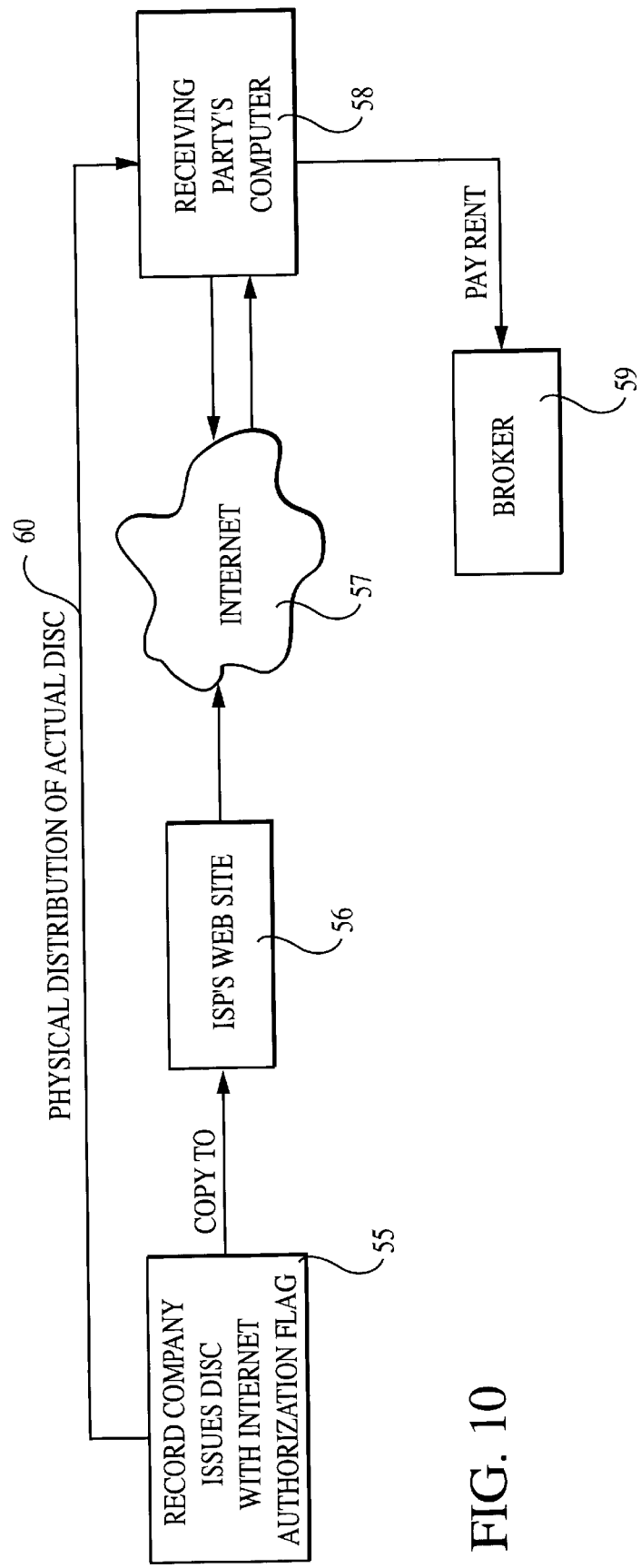
FIG. 10 shows a schematic of the monitoring process of the Internet authorization system of the present invention.

Preferably, the encoding process will occur before the final product or media (e.g., a music CD, music video, movie video, or an electronic file of the above, etc.) is mass produced and distributed. Referring to FIG. 10, after the encoding process is complete, as at 55, a record manufacturing company produces and distributes the media, such as music CDs, to, for example, Internet Service Providers, (ISPs), or other network service providers, who copy the data, such as music, onto their web site 56. Through web site 60 of each authorized ISP, music copied from each authorized CD is accessible on the Internet 57.

In carrying out the invention, for example, an ISP is provided with computer software that is capable of proactively monitoring music being accessed on the Internet. This encrypted software, which is essential for user access to the music file supplied to the user, contains a monitoring mechanism for determining the types of uses, such as whether a user is listening, recording or copying music. In other words, the software monitors music use by looking at the Internet flag authorization level of each user and permitting only those activities a user's authorization level allows.

An ISP's software is capable of searching the Internet (including chat rooms, etc.) and detecting all data packets that contain predetermined data, such as music, and further contains an Internet authorization flag. Tracking is accomplished, for example, using a web crawler or manually at the ISP level. Other techniques may also be used. When a search detects the predetermined data that does not contain an Internet authorization flag, one of two scenarios may occur: (1) a report would be issued indicating the location of unauthorized use, such as the domain server address, a user's modem telephone number, the user's home or other unique identification; or (2) some specific action may be taken.

In the event that music or other predetermined data requiring authorized access thereto is transmitted as an encrypted message over the Internet or other network, decryption is required, using conventional techniques. One conventional decryption technique is to transmit each audio signal with some form of a header. Once the signal is decrypted, then a determination can be made whether the music is authorized.

A user or receiving party desiring to access music over the world wide web, will access an authorized broker or ISP domain site 56 on the Internet. That is, a legitimate chain of use begins with an Internet Service Provider or broker 59 that is authorized to provide certain music on the Internet, and for which a royalty is paid according to the number of hits that the ISP/broker receives for the music. On the receiving end, the amount of royalty a user pays when accessing music from an authorized ISP or broker 59 could be dependent on the level of authorization that a user desires. While the above discussion has discussed an example where the predetermined data comprises music, other types of data may also be used.

According to one embodiment of the present invention, an Internet or content authorization flag contains differing values, reflecting varying levels of authorization. Each level of authorization essentially dictates specified Internet or network uses of a musical recording or other predetermined data, such as whether a user could listen to the music, copy the music, or how many multiple copies can be made.

There are several types of control for each level of authorization associated with an authorization flag that is designed to control user access to a data or musical recording. A basic mechanism of one embodiment, at the recipient's end, is encryption of the file and payment mechanisms that unlocks the file and enables a user to do certain things with the data or music. Encryption mechanisms will control whether a user is granted access to the music file. Payment mechanisms will control what type of access is permitted, such as whether a user may listen only to the music, or whether a user may copy music to the Internet, to a local computer, or to a local area network. (Encryption and payment mechanisms on the Internet are well known.) Even if a file may be stored on a user's hard drive, it is optionally and advantageously stored in encrypted form, and without the key available to decrypt the file, there would be playback control and/or prevention without proper authorization.

So depending on the level of authorization that a user purchases, either directly from an ISP's web site 56 or from an authorized broker 59, a user can obtain different types of Internet uses for music or other data. Internet uses may include 'listens once', 'listens twice', 'do not copy', 'copy once', 'copy twice', 'copy thrice', 'multiple listeners', 'download', 'distribute', etc.

One level of authorization may allow a user to pay one rate for just listening. Another level of authorization may control the number of copies a user can make of a musical recording. One basic mechanism for allowing copy control involves incorporating a counter into the ISP-provided software, which does the certification process of verifying each user and verifying that payment was made.

For instance, if a user is authorized to make one copy only and attempts to make another copy of a particular music, the software counter inspects that part of the encryption zone and verifies that payment was received for one copy and that one copy was made. Once this information is verified, the software prevents a user from making additional unauthorized copies of that music. Additionally, the software may be tamper-resistant such that breaches to the software is detectable.

In addition to Internet access control, another usefulness of embedding Internet authorization flag is the ability to track distribution of music on the Internet. The application of a coded identification signal, via the Internet authorization flag, to the genuine content of an original recording serves to establish its source and ownership. Since each original recording is embedded with such an Internet authorization flag, a search for the flag's existence would provide an important legal or other tracing 'hit' when a user accesses an Internet Service Provider's web site 56 and downloads the information, for instance. Thus, Internet tracking is triggered when a 'hit' occurs via a hot link.

Alternatively, the Internet authorization flag may be used in combination with a copyright flag, which may also be embedded in an original audio signal. Preferably, both copyright and Internet authorization flags can be embedded signals. Thus, each musical recording will contain both flags, or at least an Internet authorization flag, at the time the musical recording is uploaded onto the Internet for transmission.

There is a distinction between a copyright flag and an Internet authorization flag. The copyright flag does not provide any information as to use of the copyrighted work. It merely indicates that the music is a copyrighted work. However, an Internet flag basically indicates that a user is licensed to place, access and/or transmit an original musical recording on the Internet in a predetermined manner.

In an alternative embodiment, which typifies physical distribution channels, as at 60, a user who receives a musical recording containing an Internet authorization flag, could receive a special tape or CD from the recording company through the mail. This tape or CD would be configured differently from other tapes or CD's sold in retail stores, because the user would be told that the tape or CD contains special flags for Internet use, making the user an authorized Internet user. Consequently, the user would be allowed to place the music on the Internet by the existence of the Internet authorization flag embedded in the musical recording, and by the use of the special CD configured to allow specified uses (i.e. copying) from/to the Internet.

Figure 11:
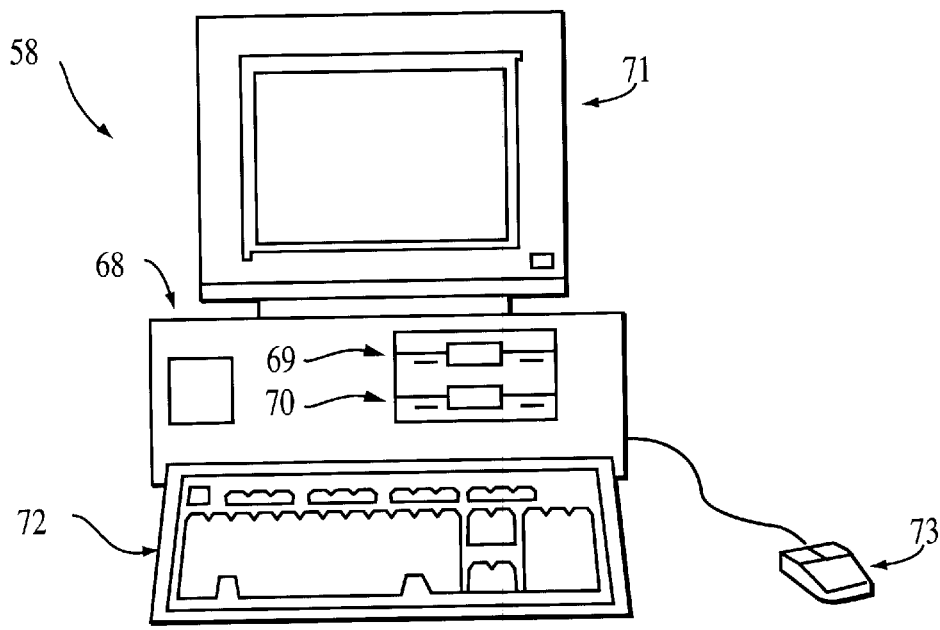
FIG. 11 shows a block diagram of a computer used for implementing the computer processing in accordance with a computer implemented embodiment of the present invention.

FIG. 11 is an illustration of a computer 58 used for implementing the computer processing in accordance with a computer implemented embodiment of the present invention. The procedures described above may be presented in terms of program procedures executed on, for example, a computer or network of computers.

Viewed externally in FIG. 11, computer 58 has a central processing unit (CPU) 68 having disk drives 69, 70. Disk drives 69, 70 are merely symbolic of a number of disk drives that might be accommodated by computer 58. Typically, these would include a floppy disk drive, as at 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information is displayed. The display is optional for the central computer used in conjunction with the system described herein. A keyboard 72 and a pointing device 73, such as mouse 73, will be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Figure 13:
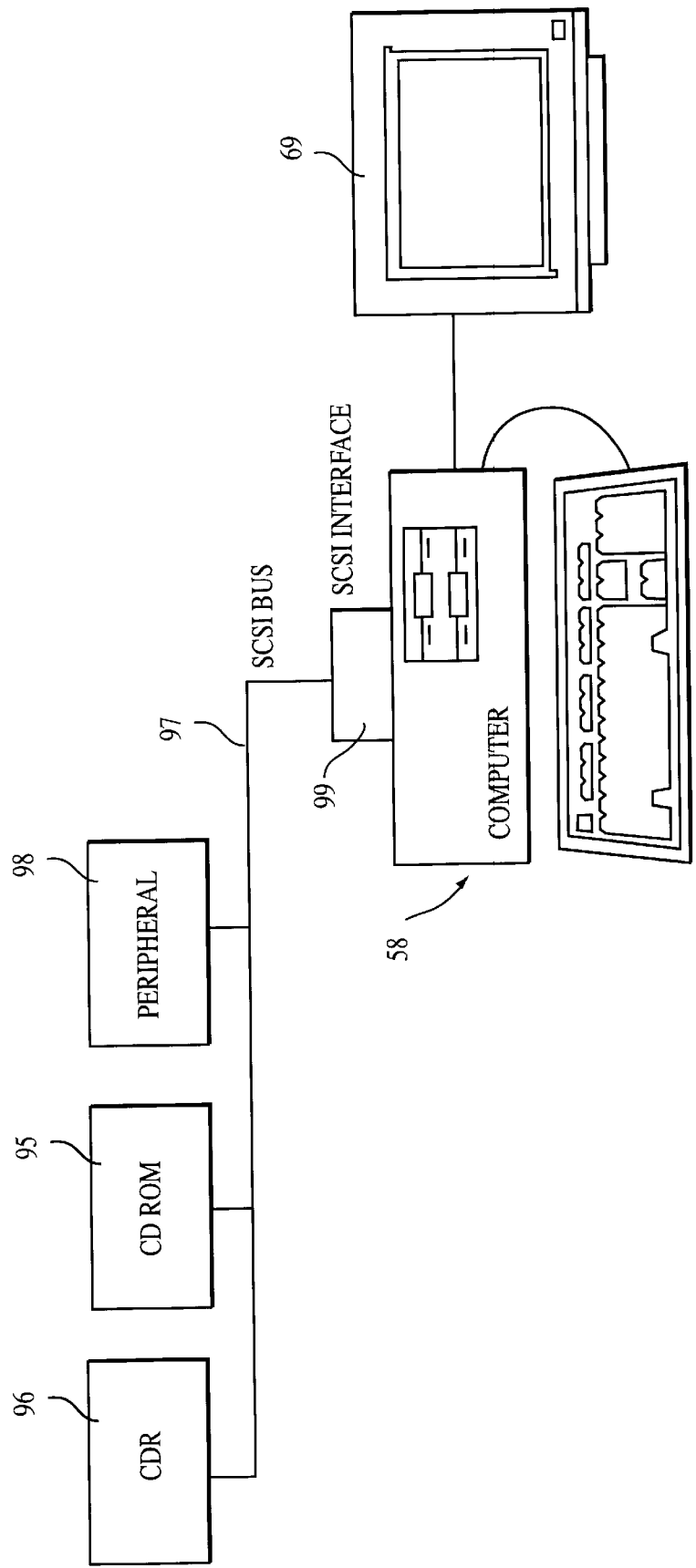
FIG. 13 illustrates a block diagram of an alternative computer of a type suitable for carrying out the present invention.

Alternatively, referring to FIG. 13, computer 58 may also include a CD ROM reader 95 and CD recorder 96, which are interconnected by a bus 97 along with other peripheral devices 98 supported by the bus structure and protocol. Bus 97 serves as the main information highway interconnecting other components of the computer. It is connected via an interface 99 to computer 58.

Figure 12:
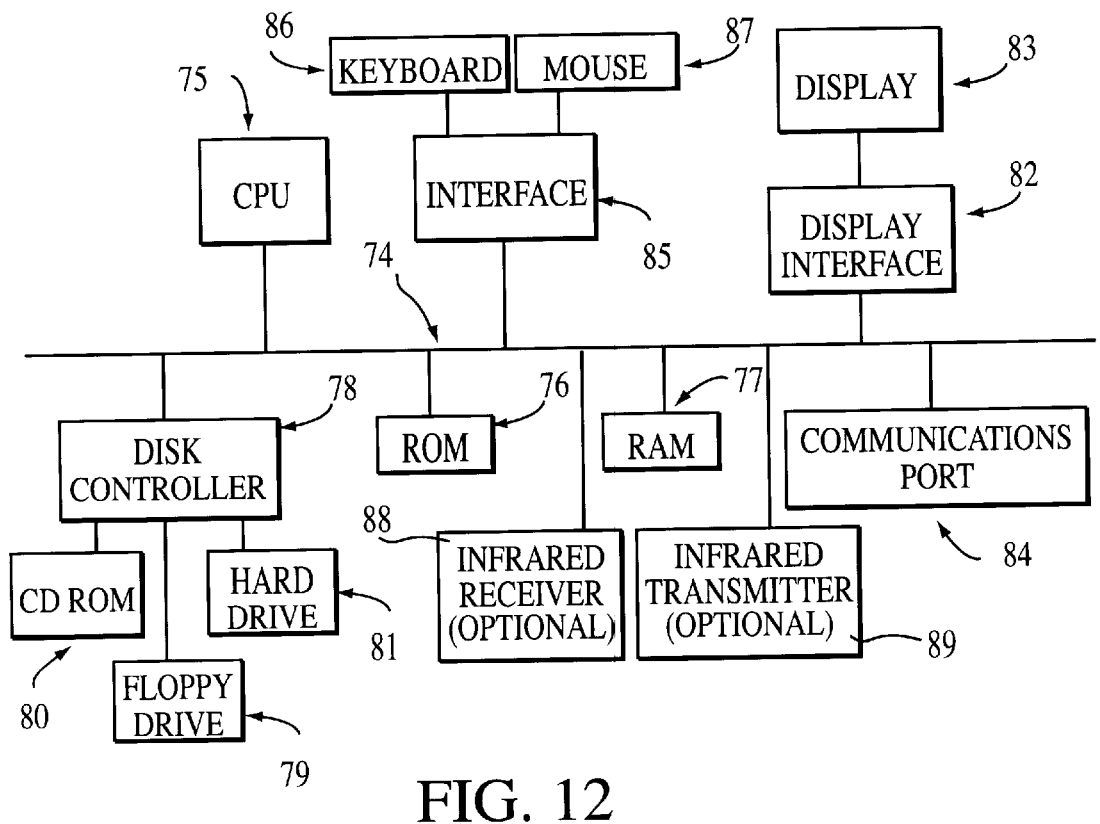
FIG. 12 illustrates a block diagram of the internal hardware of the computer of FIG. 11.

FIG. 12 illustrates a block diagram of the internal hardware of the computer of FIG. 11. CPU 75 is the central processing unit of the system, performing calculations and logic operations required to execute a program. Read only memory (ROM) 76 and random access memory (RAM) 77 constitute the main memory of the computer.

Disk controller 78 interfaces one or more disk drives to the system bus 74. These disk drives may be floppy disk drives such as 79, or CD ROM or DVD (digital video/ versatile disk) drives, as at 80, or internal or external hard drives 81. As previously indicated, these various disk drives and disk controllers are optional devices.

A display interface 82 permits information from bus 74 to be displayed on the display 83. Again, as indicated, display 83 is also an optional accessory for a central or remote computer in the communication network, as are infrared receiver 88 and transmitter 89. Communication with eternal devices occurs using communications port 84.

In addition to the standard components of the computer, the computer also includes an interface 85, which allows for data input through the keyboard 86 or pointing device, such as a mouse 87.

Conventional processing system architecture is more fully discussed in *Computer Organization and Architecture,* by William Stallings, MacMillan Publishing Co. (3rd ed. 1993). Conventional processing system network design is more fully discussed in *Data Network Design,* by Darren L. Spohn, McGraw-Hill, Inc. (1993). And conventional data communications is more fully discussed in *Data Communications Principles,* by R. D. Gitlin, J. F. Hayes and S. B. Weinstain, Plenum Press (1992), and in *The Irwin Handbook of Telecommunications,* by James Harry Green, Irwin Professional Publishing (2nd ed. 1992). Each of the foregoing publications is incorporated herein by reference.

Figure 14:
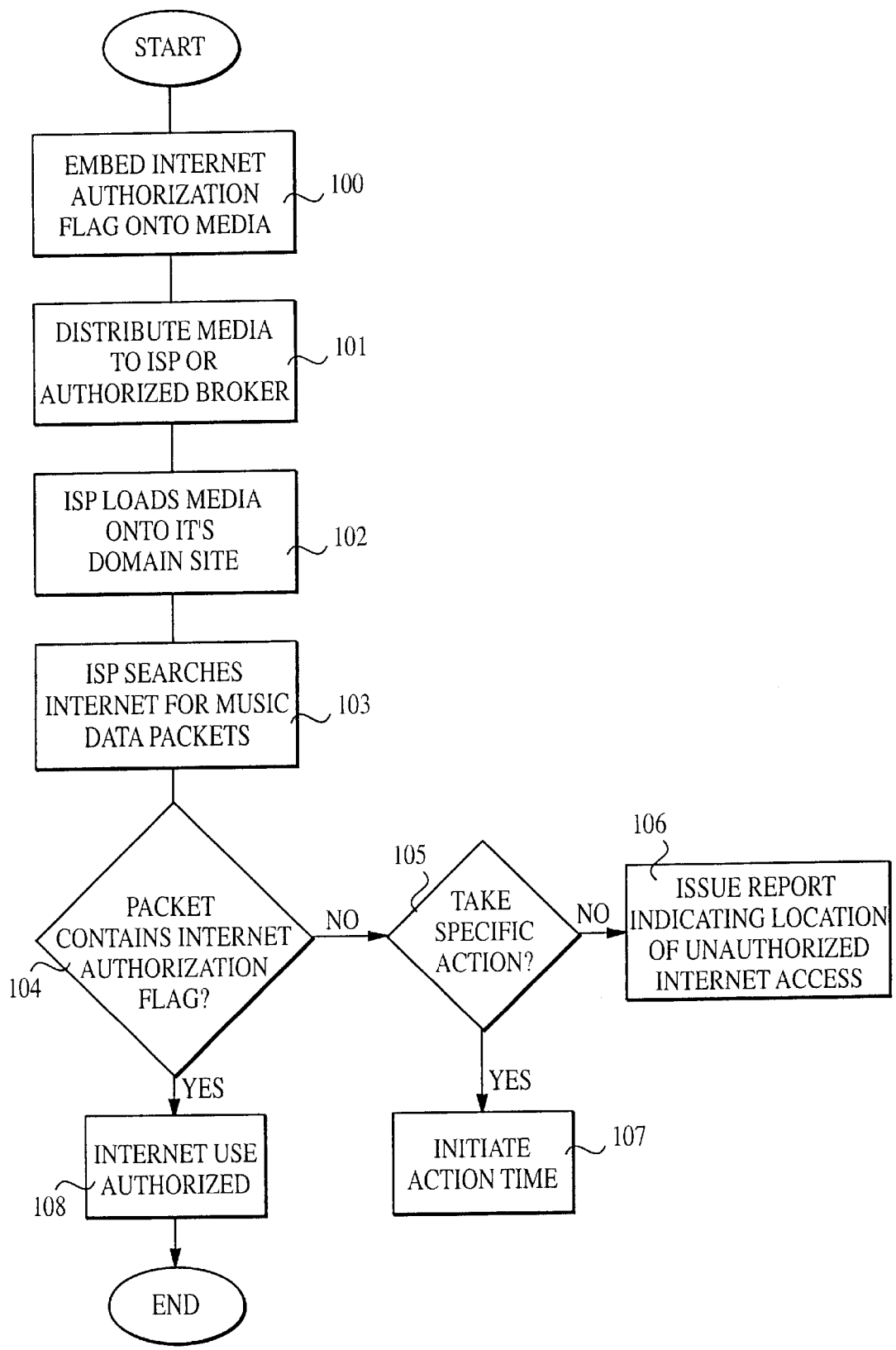
FIG. 14 illustrates a flow chart of the monitoring process of the Internet authorization flagging system of the present invention.

FIG. 14 illustrates a flow chart of the monitoring process of the Internet authorization flagging system of the present invention. The process begins at box 100 where an Internet authorization flag is embedded onto a media. At box 101, the media is distributed to an ISP or authorized broker, which loads the media onto its domain web site, as indicated in box 102. Using software capable of detecting data packets containing music, an ISP searches the Internet for music data packets, as at box 103. At box 104, the software determines whether each packet contains an Internet authorization flag. If a flag exists, Internet use is authorized, as at box 108. If a flag does not exist in the music data packet, a determination query is made as to whether specific action is taken, as at box 105. If so, specific action is initiated, as at box 107. If not, a report is issued indicating the location of unauthorized Internet access, as at box 106.

Figure 15:
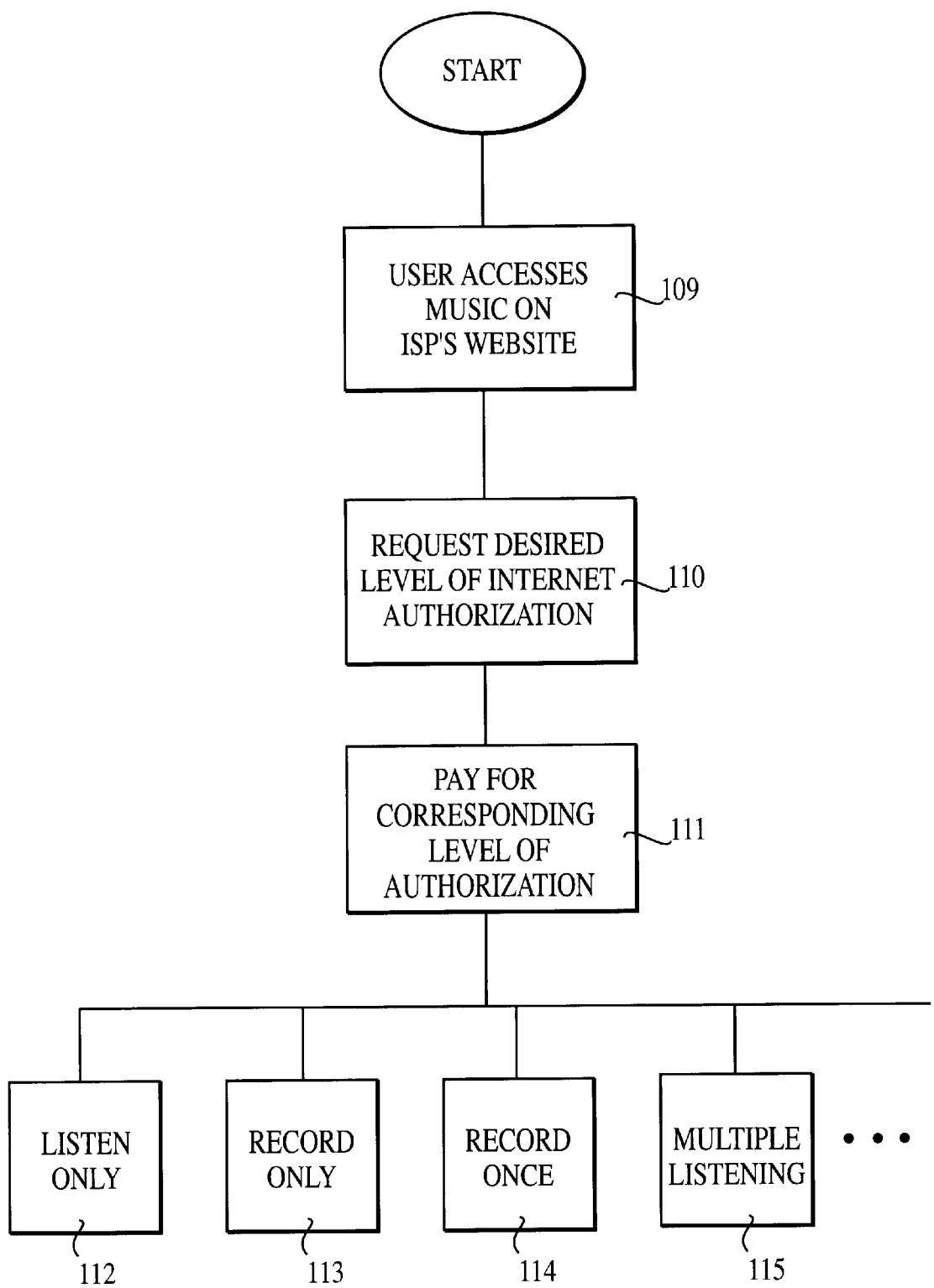
FIG. 15 illustrates a flow chart of a user's access in the monitoring process of the Internet authorization flagging system of the present invention.

FIG. 15 illustrates a flow chart of a user's access in the monitoring process of the Internet authorization flagging system of the present invention. This process begins with a user accessing an ISP's web site 60 for a desired music. (Box 109). Depending on the kind of Internet music use, a user requests a desired level of Internet authorization, which is reflected in a specified value of the Internet authorization flag. (Box 110). Upon selecting a desired music use, a user pays for the corresponding Internet authorization level, (box 111), and receives the desired option of predetermined authorization, which may be 'listen only' (box 112), 'record only' (box 113), 'record once' (box 114), 'multiple listening' (box 115), or the like (e.g. transmit for redistribution or sale, multiple recording, etc.). Only those Internet uses a user's authorization level allows will be permitted.

Although the invention has been described in connection with various specific embodiments, those skilled in the art recognize that various adaptations and modification may be made without departing from the spirit and scope of the invention as set forth in the claims. For example, the description above has primarily been directed to audio information applications of the invention.

However, other applications of the present invention may be directed to video information applications, such as movies, music videos, and other entertainment and educational videos. Additionally, distribution of music over the Internet may involve multiple brokers and multiple payment mechanisms. Use of the present invention is not limited to the above-mentioned applications. The present invention may be generally used for the protection of information carrying signals or software of any kind that may be copied without authorization.

Further, while the present invention has discussed examples of specific authorization levels, other authorization levels may be used as the predetermined authorization level of the present invention.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction illustrated and described and, accordingly, all suitable modifications and equivalence may be resorted to, falling within the scope of the invention.

What is claimed is:

1. In an Internet authorization system for at least one of preventing Internet access and unauthorized use of proprietary data over the Internet, a method including the steps of:
    (a) encoding an Internet authorization flag, indicating whether proprietary data stored on a media may be accessed over the Internet, with at least one of a continuously and periodically encoded sequence, and optionally compressing the encoded Internet authorization flag;
    (b) storing, in a media, the proprietary data and the encoded Internet authorization flag;
    (c) distributing said media to at least one of an Internet service provider, a site provider, a network provider, and an authorized broker of said media;
    (d) determining whether or not to provide access over the Internet to the proprietary data stored on said media and permitting or denying access over the Internet, respectively, to the proprietary data stored on said media responsive to an attempted access, when the Internet authorization flag indicates that the proprietary data may or may not be accessed over the Internet
    (e) searching data, contained on at least one of the Internet, intranet and network, for existence of said Internet authorization flag when a user accesses a web site on at least one of said Internet, intranet and network; and
    (f) generating a report indicating a location of each unauthorized use of said media, on at least one of said Internet, intranet and network, not containing an Internet authorization flag.

2. In an Internet authorization system according to claim 1, wherein said Internet authorization flag includes values corresponding to differing authorization levels, which dictate permissible uses of said media via the Internet.

3. In an Internet authorization system according to claim 2, wherein said Internet authorization flag includes a payment mechanism for controlling the level of Internet authorization a user may purchase.

4. In an Internet-authorization system according to claim 3, wherein control of said level of Internet authorization corresponding to specified Internet uses of a media, is accomplished by verifying the number of permitted Internet uses, by verifying whether payment has been made for said permitted Internet uses, and by preventing unauthorized Internet uses for which payment has not been made.

5. In an Internet authorization system according to claim 1, wherein said Internet authorization flag authorizes permissible Internet uses to include distributing, listening, recording, copying, viewing and downloading.

6. In an Internet authorization system according to claim 1, and further including, on said media, in addition to said Internet authorization flag, a copyright authorization flag for indicating a proprietary status of information stored in said media for non-Internet related uses.

7. In a network authorization system for at least one of preventing network access and unauthorized use of proprietary data over the network, a method including the steps of:
    (a) encoding a network authorization flag, indicating whether proprietary data stored on a media may be accessed over a network, with at least one of a continuously and periodically encoded sequence, and optionally compressing the encoded network authorization flag;
    (b) storing, in a media, the proprietary data and said encoded network authorization flag;
    (c) distributing said media to at least one of a network service provider, a site provider, an Internet service provider and an authorized broker of said media;
    (d) determining whether or not to provide access over the network to the proprietary data stored on said media and permitting or denying access over the network, respectively, to the proprietary data stored on said media responsive to an attempted access, when said network authorization flag indicates that the proprietary data may be accessed over the network
    (e) searching data, contained on at least one of the Internet, intranet and network, for existence of said network authorization flag when a user accesses a web site on at least one of said Internet, intranet and network; and
    (f) generating a report indicating a location of each unauthorized use of said media, on at least one of said Internet, intranet and network, not containing a network authorization flag.

8. In a network authorization system according to claim 7, wherein said network authorization flag includes values corresponding to differing authorization levels, which dictate permissible uses of said media via the network.

9. In a network authorization system according to claim 8, wherein said network authorization flag includes a payment mechanism for controlling the level of network authorization a user may purchase.

10. In a network authorization system according to claim 9, wherein control of said level of network authorization corresponding to specified network uses of a media, is accomplished by verifying the number of permitted network uses, by verifying whether payment has been made for said permitted network uses, and by preventing unauthorized network uses for which payment has not been made.

11. In a network authorization system according to claim 7, wherein said network authorization flag authorizes permissible network uses to include distributing, listening, recording, copying, viewing and downloading.

12. In a network authorization system according to claim 7, and further including, on said media, in addition to said network authorization flag, a copyright authorization flag for indicating a proprietary status of information stored in said media for non-network related uses.

13. In a content authorization system for at least one of preventing electronic access and unauthorized use of proprietary data from a first destination to a second destination, a method including the steps of:

(a) encoding a content authorization flag, indicating whether proprietary data stored on a media may be accessed electronically, with at least one of a continuously and periodically encoded sequence, and optionally compressing the content authorization flag;

(b) storing, in a media, the proprietary data and said encoded content authorization flag;

(c) distributing said media to at least one of an Internet service provider, a network service provider, a site provider, and an authorized broker of said media;

(d) determining whether or not to provide access electronically to the proprietary data stored on said media and permitting or denying access electronically to the proprietary data responsive to the content authorization flag, responsive to an attempted access, when the content authorization flag indicates that the proprietary data may be accessed electronically;

(e) searching data, contained on at least one of the Internet, intranet and network, for existence of said content authorization flag when a user accesses a web site on at least one of said Internet, intranet and network; and (f) generating a report indicating a location of each unauthorized content use of said media, on at least one of said internet, intranet and network, not containing a content authorization flag.

14. In a content authorization system according to claim 13, wherein said content authorization flag includes values corresponding to differing authorization levels, which dictate specified content uses of said media electronically.

15. In a content authorization system according to claim 14, wherein said content authorization flag includes a payment mechanism for controlling the level of content authorization a user may purchase.

16. In a content authorization system according to claim 15, wherein control of said level of content authorization corresponding to specified content uses of a media, is accomplished by verifying the number of permitted content uses, by verifying whether payment has been made for said permitted content uses, for which payment has not been made.

17. In a content authorization system according to claim 13, wherein said content authorization flag authorizes permissible content uses to include distributing, listening, recording, copying, viewing and downloading.

18. In a content authorization system according to claim 13, and further including, on said media, in addition to said content authorization flag, a copyright authorization flag for indicating a proprietary status of information stored in said media for non-Internet related uses.

19. An Internet authorization system for at least one of preventing Internet access and unauthorized use of proprietary data over the Internet, said system comprising:

a plurality of interconnected general purpose computers that are networked together in at least one of an intranet and Internet arrangement;

encoding means for encoding an Internet authorization flag, indicating whether or not proprietary data stored on a media may be accessed over the Internet, with at least one of a continuously and periodically encoded sequence, and optionally compressing the encoded Internet authorization flag;

media storage means for storing, in a media, proprietary data and the encoded Internet authorization flag;

a network system means for distributing said media to at least one of an Internet service provider, a network provider, a site provider and an authorized broker of said media.

searching means for searching data, contained on at least one of the Internet, intranet and network, for existence of said Internet authorization flag when a user accesses a web site on at least one of said Internet, intranet and network; and generating means for generating a report indicating a location of each Internet use of said media, on at least one of said Internet, intranet and network, not containing an Internet authorization flag.

20. An Internet authorization system according to claim 19, wherein specified Internet uses of said media is determined by differing Internet authorization flag values, which correspond to differing authorization levels.

21. An Internet authorization system according to claim 20, wherein control of each level of Internet authorization a user may purchase is determined by a payment mechanism included in said Internet authorization flag.

22. An Internet authorization system according to claim 21, wherein control of said level of Internet authorization corresponding to specified Internet uses of a media, is accomplished by verifying the number of permitted Internet uses, by verifying whether payment has been made for said permitted Internet uses, and by preventing unauthorized Internet uses for which payment has not been made.

23. An Internet authorization system according to claim 19, wherein said Internet authorization flag determines and authorizes permissible Internet uses to include distributing, listening, recording, copying, viewing and downloading.

24. An Internet authorization system according to claim 19, and further including, on said media, in addition to said Internet authorization flag, a copyright authorization flag means for indicating a proprietary status of information stored in said media for non-Internet related uses.

25. A content authorization system for at least one of preventing content access and unauthorized use of proprietary data over at least one of a global network, local network and the Internet, said system comprising:

a plurality of at least one of workstations and computers, each including a first storage device for storing first data therein;

a network connectable to said plurality of at least one of workstations and computers, said network including a second storage device for storing second data thereon, said second data comprising said proprietary data including at least one encoded authorization data flag indicating at least one authorization level indicative of authorized usage of the proprietary data for said network and said plurality of at least one of workstations and computers, said network managed by or interconnectable with at least one of an Internet service provider, a network provider, a site provider, and an authorized broker or distributor of the proprietary data, wherein said second data are distributed thereon; and when said at least one authorization data flag exists and is indicative of authorized usage or unauthorized usage, respectively, permitting or denying access of said proprietary data over at least one of the global network, local network and the Internet, and when said at least one authorization data flag does not exist, generating a report indicating a location of each network use of said second data not containing an authorization data flag.

26. A content authorization system according to claim 25, wherein said at least one authorization data flag includes a plurality of authorization data flags providing the capability of different authorization levels for usage of the proprietary data for said plurality of at least one of workstations and computers, and the at least one of the Internet service provider, the network provider, the site provider and the authorized broker or distributor.

* * * * *